(12) United States Patent
Namuduri et al.

(10) Patent No.: US 9,118,210 B2
(45) Date of Patent: Aug. 25, 2015

(54) ELECTRICAL SYSTEM AND METHOD FOR A HYBRID-ELECTRIC VEHICLE

(71) Applicant: GM Global Technology Operations LLC, Detroit, MI (US)

(72) Inventors: Chandra S. Namuduri, Troy, MI (US); Michael G. Reynolds, Troy, MI (US); Kenneth J. Shoemaker, Highland, MI (US); Theo L. Moreno, Birmingham, MI (US); James F. Crawford, Macomb, MI (US); Detlev Schäfer, Dexheim (DE); Danny Y. Mui, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 257 days.

(21) Appl. No.: 13/652,116

(22) Filed: Oct. 15, 2012

(65) Prior Publication Data
US 2014/0103722 A1   Apr. 17, 2014

(51) Int. Cl.
| | |
|---|---|
| H02J 3/14 | (2006.01) |
| H02J 7/34 | (2006.01) |
| B60L 1/00 | (2006.01) |
| B60L 11/00 | (2006.01) |
| B60L 11/14 | (2006.01) |
| B60L 11/18 | (2006.01) |
| H02J 7/14 | (2006.01) |

(52) U.S. Cl.
CPC .................. *H02J 7/345* (2013.01); *B60L 1/003* (2013.01); *B60L 11/005* (2013.01); *B60L 11/14* (2013.01); *B60L 11/1868* (2013.01); *H02J 7/1423* (2013.01); *B60L 2240/545* (2013.01); *B60L 2250/16* (2013.01); *Y10T 307/461* (2015.04); *Y10T 307/469* (2015.04)

(58) Field of Classification Search
CPC ....... H02J 3/14; Y02B 70/3225; Y04S 20/222
USPC .............. 307/28, 38, 39, 9.1, 10.1, 10.6, 10.7
See application file for complete search history.

(56) References Cited

U.S. PATENT DOCUMENTS

| | | | |
|---|---|---|---|
| 2002/0008495 A1* | 1/2002 | Dougherty et al. | 320/104 |
| 2004/0046137 A1* | 3/2004 | Herbert et al. | 251/129.04 |
| 2005/0099009 A1* | 5/2005 | Spellman et al. | 290/38 R |
| 2006/0068242 A1* | 3/2006 | Norimatsu et al. | 429/12 |
| 2006/0097671 A1* | 5/2006 | Yoshida | 318/109 |
| 2007/0236152 A1* | 10/2007 | Davis et al. | 315/209 R |
| 2008/0087479 A1* | 4/2008 | Kang | 180/65.3 |
| 2008/0129639 A1* | 6/2008 | Mitsugi | 343/876 |
| 2011/0140518 A1* | 6/2011 | Hattori | 307/9.1 |
| 2012/0313586 A1* | 12/2012 | Signorelli et al. | 320/128 |
| 2013/0106180 A1* | 5/2013 | Akimasa et al. | 307/9.1 |
| 2013/0264869 A1* | 10/2013 | Klinkig et al. | 307/10.6 |

* cited by examiner

*Primary Examiner* — Rexford Barnie
*Assistant Examiner* — Toan Vu
(74) *Attorney, Agent, or Firm* — Ingrassia Fisher & Lorenz, P.C.

(57) ABSTRACT

An electrical system includes a battery for providing electrical power to a starter mechanism and an auxiliary load of a hybrid-electric vehicle. An electric double-layer capacitor ("EDLC") is electrically connectable to the battery and the auxiliary load. A separation switch is electrically connected between the battery and the EDLC for electrically separating the battery from the EDLC and the auxiliary load. The separation switch is opened in response to the voltage across the battery being less than the voltage across the EDLC.

15 Claims, 5 Drawing Sheets

ELECTRICAL SYSTEM AND METHOD FOR A HYBRID-ELECTRIC VEHICLE

TECHNICAL FIELD

The technical field generally relates to battery powered electrical systems, and more particularly relates to electrical systems for vehicles, such as hybrid-electric vehicles that automatically stop and start an engine.

BACKGROUND

A typical hybrid-electric vehicle ("HEV") includes both an internal combustion engine and an electrical drive motor. The internal combustion engine and/or the electrical drive motor may be utilized at various times to propel the vehicle. The HEV includes an electrical system having a battery that supplies electrical energy to the electric drive motor. A generator is coupled to the engine and electrically connected to the battery for charging the battery. The engine may be routinely stopped to save fuel consumption when the vehicle comes to a stop and restarted as needed to propel the vehicle.

A starter mechanism is typically employed to assist in starting the engine of the HEV. Such starter mechanisms require a large current draw when starting the engine. As such, the voltage drop across the battery is significant. This voltage drop would cause auxiliary electrical loads of the HEV, e.g., lights, radio, etc., to not function properly. Accordingly, a typical HEV uses an entirely separate electrical system, with a separate battery, for providing completely isolated electrical power to the auxiliary electrical loads. This separate electrical system adds additional cost and weight to the HEV.

Accordingly, it is desirable to provide an electrical system for a vehicle that does not require multiple batteries. In addition, it is desirable to provide a HEV that does not require separate electrical systems. Furthermore, other desirable features and characteristics of the present disclosure will become apparent from the subsequent detailed description and the appended claims, taken in conjunction with the accompanying drawings and the foregoing technical field and background.

SUMMARY

An electrical system is provided. In one exemplary embodiment, the system includes a battery for providing electrical power to a starter mechanism and an auxiliary load. The system also includes an electric double-layer capacitor ("EDLC") electrically connectable to the battery and the auxiliary load. A separation switch is electrically connected between the battery and the EDLC for electrically separating the battery from the EDLC.

A method is provided for controlling the electrical system. In one exemplary embodiment, the method includes sensing the voltage across the battery and sensing the voltage across the auxiliary load. The method further includes opening the separation switch in response to the voltage across the battery being less than the voltage across the EDLC.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
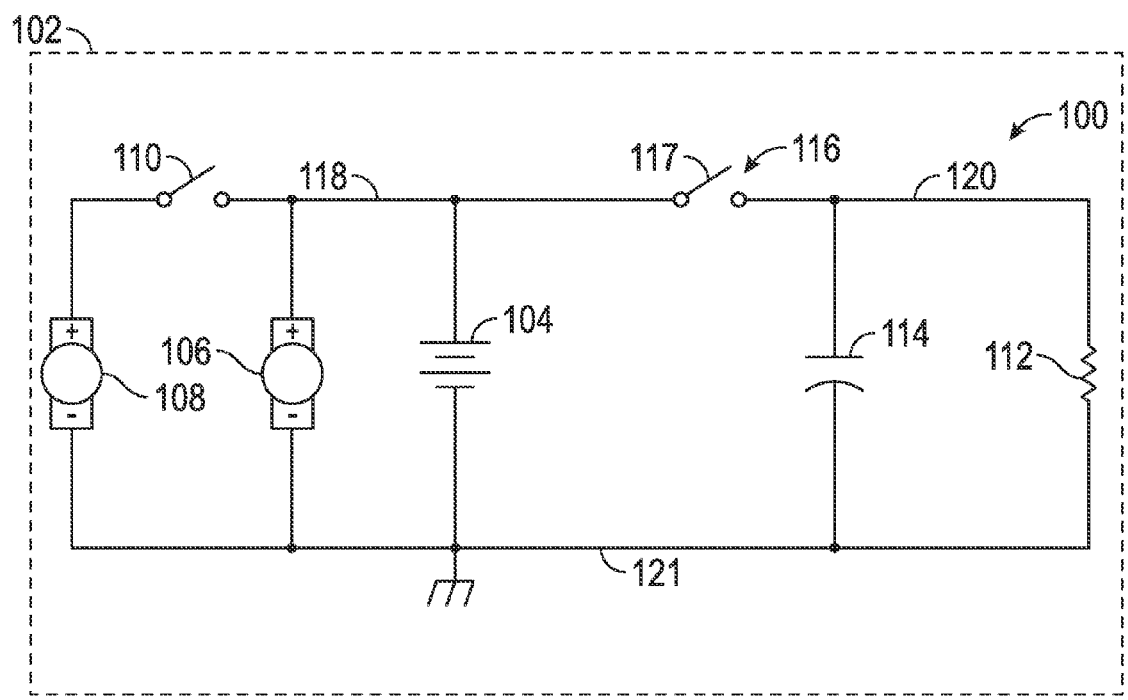
FIG. 1 is an electrical schematic of an electrical system in accordance with a first exemplary embodiment.

The following detailed description is merely exemplary in nature and is not intended to limit the application and uses. Furthermore, there is no intention to be bound by any expressed or implied theory presented in the preceding technical field, background, brief summary or the following detailed description.

Referring to the figures, wherein like numerals indicate like parts throughout the several views, an electrical system 100 and method for controlling an electrical system 100 is shown and/or described herein. The electrical system 100 may be utilized in a vehicle 102. In the illustrated embodiments, the vehicle 102 is an automobile equipped with an internal combustion engine (not shown) and an automatic start/stop function to automatically control the starting and stopping of the engine (e.g., a hybrid-electric vehicle). However, the electrical system 100 may also be utilized in other types of vehicles 102, such as conventional (i.e., non-hybrid) automobiles or electric automobiles. Furthermore, the electrical system 100 described herein may also be used in non-vehicle applications.

The system 100 includes a battery 104. The battery 104, as appreciated by those skilled in the art, includes at least one electrochemical cell to store electrical energy. The battery 104 may be a nickel metal hydride battery, lithium ion battery, lead-acid battery, or any other suitable type of electrochemical storage device known to those skilled in the art.

The vehicle 102 of the illustrated exemplary embodiments also includes a generator 106 operatively connected to the internal combustion engine and electrically connected to the battery 104. As such, the generator 106 may generate electrical energy when the engine is running and the electrical energy may be stored in the battery 104. During operation of the vehicle 102 of the illustrated exemplary embodiments, the engine, and thus the generator 106, are routinely, and automatically, turned on and off depending on the demands of the vehicle 102 and the driver. While the engine is running, the generator 106 maintains a sufficient voltage across the battery 104.

The system 100 of the illustrated exemplary embodiments includes a starter mechanism 108. The starter mechanism 108 is operatively connected to the engine for assisting in starting the engine. The starter mechanism 108 may include, but is not limited to, an electrical motor as is appreciated by those skilled in the art. The starter mechanism 108 may be electrically connected to the battery 104. In the illustrated exemplary embodiments, a starter switch 110 is electrically connected between the starter mechanism 108 and the battery 104. When the starter switch 110 is closed, power flows to the starter mechanism 108 to assist in starting the engine. The starter switch 110 may include, but is not limited to, an electromechanical switch.

The vehicle 102 may include one or more auxiliary loads 112 electrically connectable to the battery 104. The auxiliary loads 112 may include, but are certainly not limited to, lights (e.g., headlamps, turn signals, etc.), a radio and/or other entertainment system, sensors, electronic controllers, a fan, and a display (none of which are separately shown). For simplicity purposes, the auxiliary loads 112 will be referred to hereafter simply as the auxiliary load 112.

The system 100 further includes an electric double-layer capacitor ("EDLC") 114. The EDLC 114 has a relatively high energy density, i.e., the energy density of the EDLC is over a hundred times greater than a conventional electrolytic capacitor. The EDLC 114 may be alternately referred to as a supercapacitor, a supercondenser, an electrochemical double layer capacitor, or an ultracapacitor, by those skilled in the art. Alternatively, the system 100 may utilize a suitably-sized auxiliary battery (not shown) instead of the EDLC 114 to just support the auxiliary load 112 during automatic starting of the engine. As an example, the capacity or amp-hour (AHr) rating of the auxiliary battery could be $1/10^{th}$ to $1/5^{th}$ of that of the primary battery 104.

The EDLC 114 of the illustrated embodiments is electrically connectable to the battery 104 and/or the generator 106. As such, the EDLC 114 may be charged by the battery 104 and/or the generator 114. The EDLC 114 is also electrically connectable to the auxiliary load 112. Accordingly, the EDLC 114 may provide electrical power to the auxiliary load 112.

With reference to FIG. 1, the system 100 also includes a separation switch 116 electrically connected between the battery 104 and the EDLC 114. The separation switch is positioned to electrically separate the battery 104 from the auxiliary load 112.

The separation switch 116 may be implemented with various devices. For instance, the separation switch 116 may be implemented with an electromechanical device, e.g., a relay, or other mechanically-actuated switch. In another instance, the separation switch 116 may be implemented with a solid-state device, e.g., a Schottky diode and/or a field-effect transistor ("FET"), as described in the various exemplary embodiments below. Furthermore, multiple separation switches 116 may be utilized, and as such, a combination of different types of devices may be utilized.

In the illustrated exemplary embodiments, the system 100 includes a first node 118 and a second node 120. The first node 118 electrically connects the starter mechanism 108 and the battery 104. Specifically, in the illustrated exemplary embodiments, a positive terminal (not shown) of the battery 104 is electrically connected to the first node 118 and a negative terminal (not shown) is electrically connected to a ground node 121. In one example, the ground node 121 may also be referred to as a chassis ground. The second node 120 electrically connects the EDLC 114 and the auxiliary load 112. Of course, fuses, circuit breakers, or other circuit protection devices (none of which are shown) may be implemented in the system 100.

The separation switch 116 is electrically connected between the first node 118 and the second node 120. The separation switch 116 may separate the nodes 118, 120, such that the EDLC 114 provides electrical power to the auxiliary load 112 and the battery 104 supplies electrical power to the starter mechanism 108. Those skilled in the art realize that, when operating, the starter mechanism 108 may draw significant amounts of electrical power that can temporarily lower (i.e., droop) the voltage of the battery 104. By separating the auxiliary load 112 from the battery 104 during operation of the starter mechanism 108 the EDLC 114 may maintain a stable and sufficient voltage to the auxiliary load 112. More specifically, the separation switch 116 is opened when the voltage at the first node 118, i.e., across the battery 104, is less than the voltage at the second node 120, i.e., across the auxiliary load 112 or across the EDLC 114.

The EDLC 114 must be capable of providing electric power to the auxiliary load 112 for a period of time at least equal to the period of time in which the separation switch 116 is open. In the illustrated embodiments, the EDLC 114 is implemented with a Model No. BPAK0052 P015 B01 52F 15V 14.5 mΩ device manufactured by Maxwell Technologies, Inc., of San Diego, Calif. However, other suitable devices may also be utilized for the EDLC 114 as is appreciated by those skilled in the art.

First Exemplary Embodiment

In a first exemplary embodiment, as shown in FIG. 1, the separation switch 116 is implemented as a mechanical switch 117 which opens in response to the starter mechanism 108 operating. As such, the EDLC 114 and the auxiliary load 112 are electrically separated from the battery 104. While the mechanical switch 117 is open, the EDLC electrically powers the auxiliary load 112.

Second Exemplary Embodiment

Figure 2:
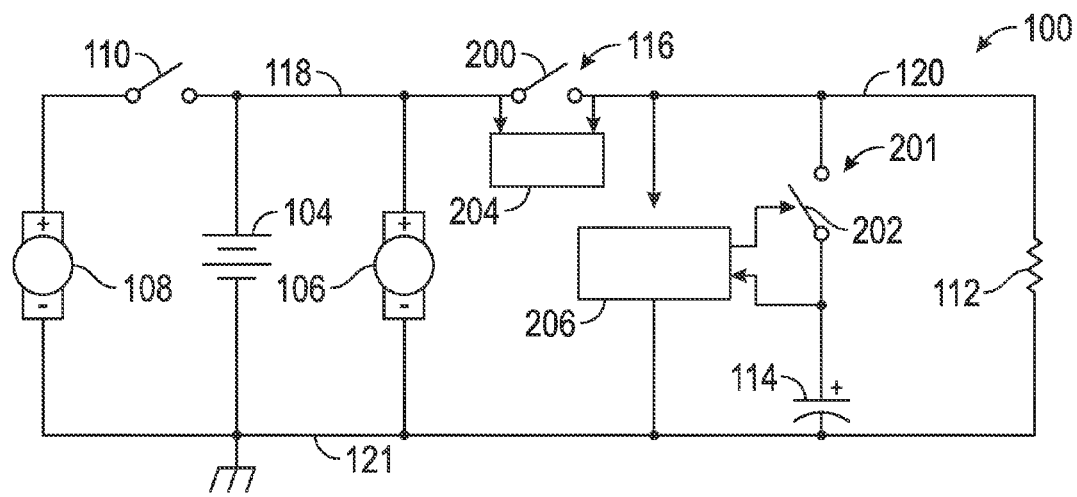
FIG. 2 is an electrical schematic of the electrical system in accordance with a second exemplary embodiment.

In a second exemplary embodiment, as shown in FIG. 2, the separation switch 116 is implemented as a first mechanical switch 200. The first mechanical switch 200 is a contact of a relay (not separately shown). However, other types of mechanical switches may be implemented, as realized by those skilled in the art.

In the second exemplary embodiment, the first mechanical switch 200 is normally closed. The first control circuit 204 opens the first mechanical switch 200 when either the voltage at the first node 118 is less than the voltage at the second node 120 or when the current flowing from the first node 118 to the second node 120 is less than zero.

The system 100 may also include a charge regulation switch 201. The charge regulation switch 201 regulates the charge stored by the EDLC 114. The charge regulation switch 201 may be implemented with various devices. For instance, the charge regulation switch 201 may be implemented with an electromechanical device, e.g., a relay, or other mechanically-actuated switch. In another instance, the charge regulation switch 201 may be implemented with a solid-state device, e.g., a field-effect transistor ("FET"), as described in the various exemplary embodiments below. Furthermore, multiple charge regulation switches 201 may be utilized, and as such, a combination of different types of switching devices may be utilized.

In the second exemplary embodiment, the charge regulation switch 201 is implemented with a second mechanical switch 202. The second mechanical switch 202 is a contact of a relay (not separately shown). However, other types of mechanical switches may be implemented, as realized by those skilled in the art.

The second mechanical switch 202 is disposed between the second node 120 and the EDLC 114. Said another way, the second mechanical switch 202 is disposed between the first mechanical switch 200 and the EDLC 114. The system 100 also includes a separation switch control circuit 204 and a controller 206. In the second embodiment, the separation switch control circuit 204 is in communication with the first mechanical switch 200 to control operation of the first mechanical switch 200. The controller 206 of the second embodiment is in communication with the second mechanical switch 202 to control operation of the second mechanical switch 202.

The controller 206 controls opening and closing of the second mechanical switch 202. The controller 206 is electrically connected to the first node 120 and the ground node 121 such that the voltages across these nodes 120, 121 may be sensed. The controller 206 is also electrically connected to the EDLC 114 such that the voltage across the EDLC 114 may be sensed. The controller 206 may be implemented with a microprocessor, microcontroller, application specific integrated circuit, digital logic elements, and/or other suitable circuitry to control the various electrical components described herein.

In one example, the second mechanical switch 202 is closed by the controller 206 when two conditions are met. The first condition is that the voltage at the first node 118 must be less than a predetermined maximum voltage that the EDLC 114 can be charged to. In the exemplary case of the model No. BPAK0052 P015 B01 52F 15V 14.5 mΩ device described above, the predetermined maximum voltage of the EDLC 114 is set to 15.75±0.25V. This limit can be modified as a function of the temperature of the EDLC 114 to maximize its operating life. The second condition is that the absolute value of the difference between the voltage at the first node 118 and the voltage across the EDLC 114 is less than or equal to a first predetermined calibration value $\Delta V1$. For example, in the second exemplary embodiment, the first predetermined calibration value $\Delta V1$ is three volts.

The second mechanical switch 202 is opened by the separation switch controller 206 when any of three conditions are met. The first condition is that the voltage at the second node 120 is greater than or equal to the predetermined maximum voltage that the EDLC 114 should be charged to. The second condition is that the voltage across the EDLC 114 is less than or equal to a predetermined minimum voltage for the EDLC 114. In the exemplary case of the model No. BPAK0052 P015 B01 52F 15V 14.5 mΩ device described above, the predetermined minimum voltage is set to approximately half the rated voltage, i.e., 7.0±0.5V. The third condition is that the absolute value of the difference between the voltage at the first node 118 and the voltage across the EDLC 114 is greater than a second predetermined calibration value $\Delta V2$. For example, in the second embodiment, the second predetermined calibration value $\Delta V2$ is four volts.

The predetermined maximum and minimum voltages of the EDLC 114 may be determined by numerous factors. One factor may be the acceptable operating voltages of the auxiliary load 112. Another factor may be the rated voltage of the EDLC 114, as set by the manufacturer, as alluded to above. For example, in the illustrated exemplary embodiment, the maximum voltage of the EDLC 114 is no greater than 90% of the rated voltage of the EDLC 114. Keeping the maximum voltage under 90% of the rated value helps extend the maximum life of the EDLC 114. Yet another factor may be the operating temperatures of the EDLC 114. Other factors will be realized by those skilled in the art.

Third Exemplary Embodiment

Figure 3:
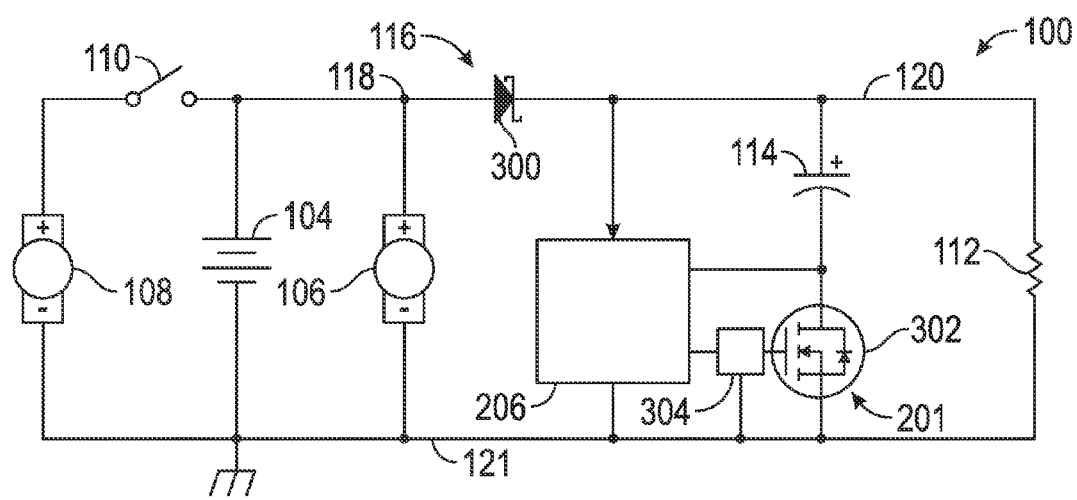
FIG. 3 is an electrical schematic of the electrical system in accordance with a third exemplary embodiment.

A third exemplary embodiment of the system 100 is shown in FIG. 3. In the third exemplary embodiment, the separation switch 116 is implemented as a Schottky diode 300 and the charge regulation switch 201 is implemented with a FET 302. The Schottky diode 300 is disposed between the battery 104 and the auxiliary load 112. More specifically, an anode (not numbered) of the Schottky diode 300 is electrically connected to the first node 118 and a cathode (not numbered) is electrically connected to the second node 120. The Schottky diode 300 isolates the auxiliary load 112 from sagging voltage of the battery 104.

In the third exemplary embodiment, the EDLC 114 is electrically connected to the second node 120. The FET 302 is electrically connected to the EDLC 114 and the ground node 121. The FET 302 of the third exemplary embodiment is a metal-oxide semiconductor FET ("MOSFET"), but other types of FETs may alternately be utilized. A FET driver 304 is electrically connected to the FET 302 to "open" and "close" the FET 302.

The system 100 of the third exemplary embodiment further includes the separation switch controller 206 electrically connected to the FET driver 304. The separation switch controller 206 is in communication with the FET driver 304 to control operation of the FET 302. The separation switch controller 206 controls operation of the FET 302 in the same manner as described above in the second exemplary embodiment.

Fourth Exemplary Embodiment

Figure 4:
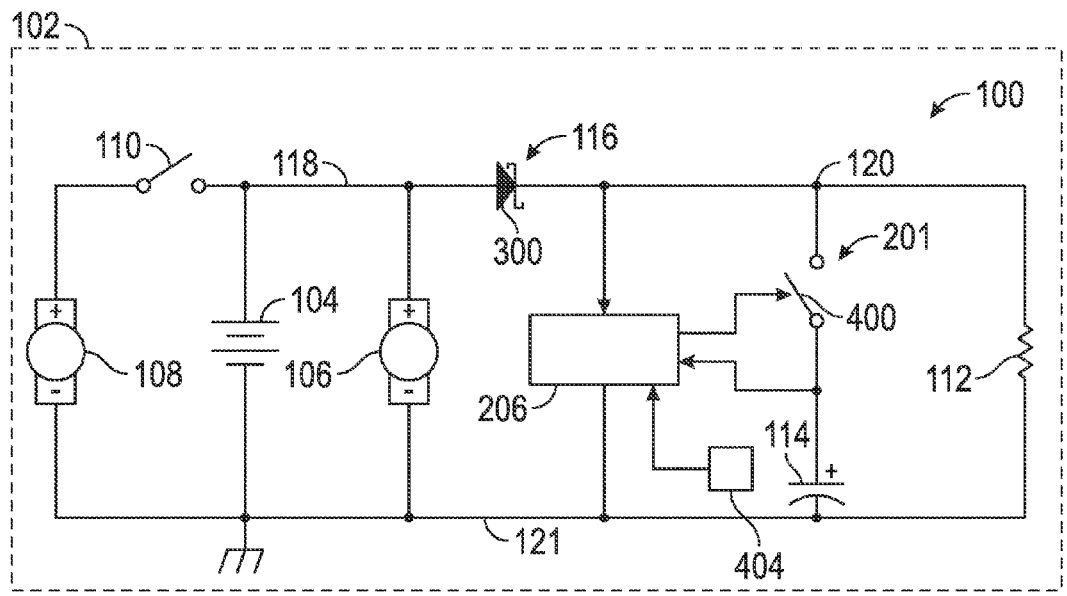
FIG. 4 is an electrical schematic of the electrical system in accordance with a fourth exemplary embodiment.

A fourth exemplary embodiment of the system 100 is shown in FIG. 4. In the fourth exemplary embodiment, the separation switch 116 is implemented with the Schottky diode 300 and the charge regulation switch 201 is implemented with a mechanical switch 400. The Schottky diode 300 is disposed between the battery 104 and the auxiliary load 112. More specifically, an anode (not numbered) of the Schottky diode 300 is electrically connected to the first node 118 and a cathode (not numbered) is electrically connected to the second node 120. The mechanical switch 400 is electrically connected to the second node 120. The EDLC 114 is electrically connected to the mechanical switch 400 and the ground node 121.

The system 100 of the fourth exemplary embodiment further includes the controller 206 in communication with the mechanical switch 400 to control operation of the mechanical switch 400. The system 100 further includes a temperature sensor 404 in communication with the controller 206. The temperature sensor 404 is positioned to detect and measure the temperature of the EDLC 114. The controller 206, in addition to opening and closing the mechanical switch 400 to regulate the voltage of the EDLC 114, may also provide over-temperature protection by opening the mechanical switch 400 when the temperature of the EDLC 114 exceeds a predetermined value. In the exemplary case of the model No. BPAK0052 P015 B01 52F 15V 14.5 mΩ device described above, the over-temperature limit is set to 60±2° C.

Fifth Exemplary Embodiment

Figure 5:
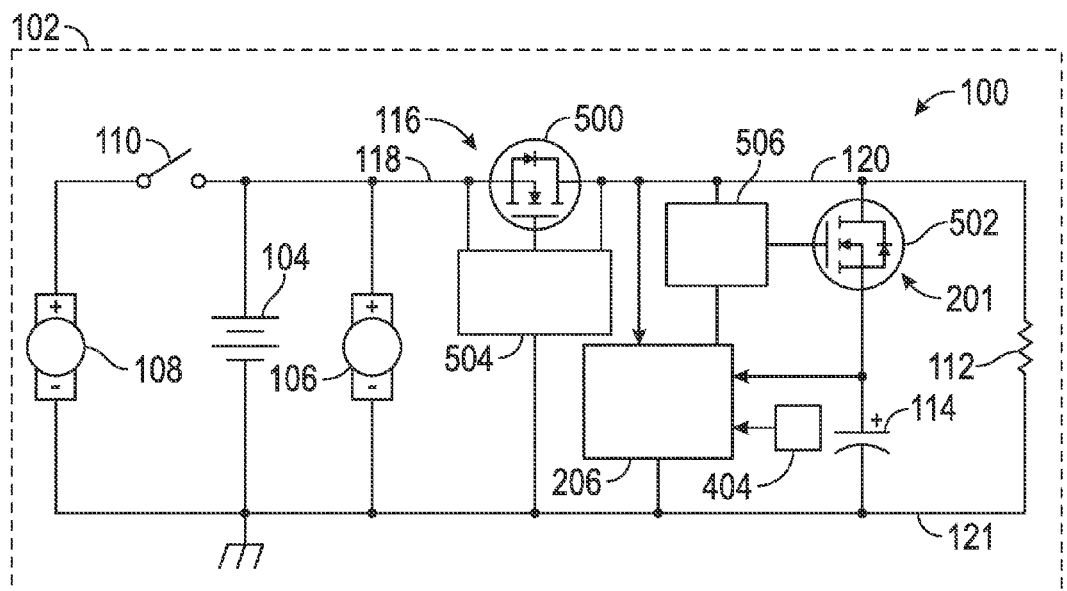
FIG. 5 is an electrical schematic of the electrical system in accordance with a fifth exemplary embodiment.

A fifth exemplary embodiment of the system 100 is shown in FIG. 5. In the fifth exemplary embodiment, the separation switch 116 is implemented with a first MOSFET 500 and the charge regulation switch 201 is implemented with a second MOSFET 502. The system 100 also includes a first MOSFET driver 504 electrically connected to a gate (not numbered) of the first MOSFET 500 to control "on" and "off" operation of the first MOSFET 500. The system 100 further includes a second MOSFET driver 506 electrically connected to a gate (not numbered) of the second MOSFET 502 to control "on" and "off" operation of the second MOSFET 502.

The first MOSFET 500 is electrically connected between the first node 118 and the second node 120. More specifically, in the fifth exemplary embodiment, a source (not numbered) of the first MOSFET 500 is electrically connected to the first node 118 and a drain (not numbered) of the first MOSFET 500 is electrically connected to the second node 120. The first MOSFET driver 504 is electrically connected to the first and second nodes 118, 120 to sense the voltage at each of the nodes 118, 120. The first MOSFET driver 504 "opens" the first MOSFET 500 when the first MOSFET 500 is reversed biased. Said another way, the first MOSFET 500 is "opened", i.e., turned off, if either the voltage at the first node 118 is less than the voltage at the second node 120 or when the current flowing from the first node 118 to the second node 120 is less than zero. Otherwise, the first MOSFET driver 504 maintains the first MOSFET 500 in a "closed" position.

The second MOSFET 500 of the fifth exemplary embodiment is electrically connected between the second node 120 and the EDLC 114. Specifically, a drain (not numbered) of the second MOSFET 502 is electrically connected to the second node 120 and a source (not numbered) of the second MOSFET 502 is electrically connected to the EDLC 114. The EDLC 114 is also electrically connected to the ground node 121.

The system 100 of the fifth exemplary embodiment also includes the controller 206 electrically connected to the second MOSFET driver 502. The controller 206 sends commands to the second MOSFET driver 502 to "open" and "close" the second MOSFET 502.

Figure 6:
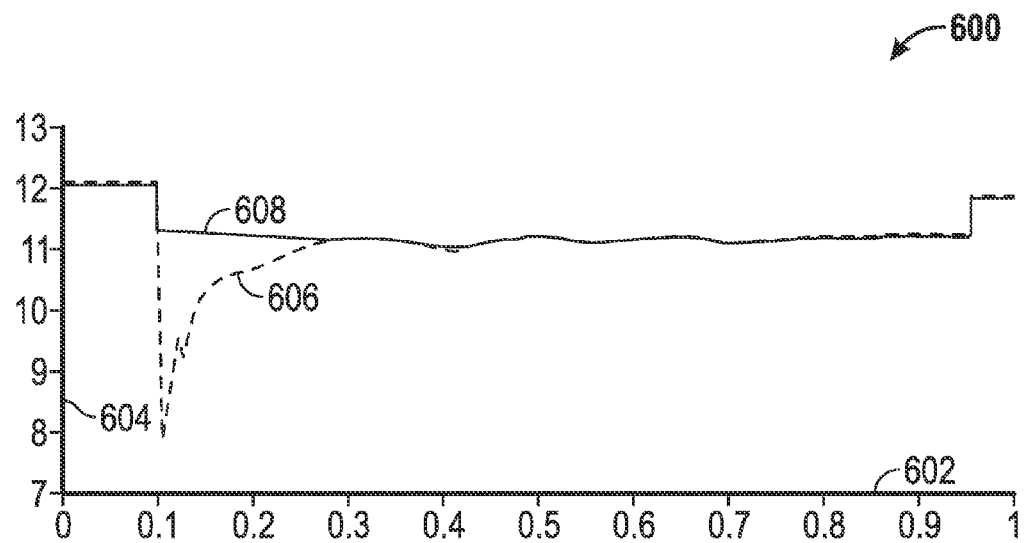
FIG. 6 is a graph showing voltage response of the electrical system in accordance with the fifth exemplary embodiment.

By isolating the first node 118 from the second node 120 during operation of starter mechanism 108, a relatively stable voltage is provided to the auxiliary load 112 by the EDLC 114. A simulation of voltage response during operation of the starter mechanism 108 is shown in a graph 600 in FIG. 6. Specifically, the x-axis 602 represents time in seconds and the y-axis 604 represents voltage in volts. A first curve 606 represents a voltage at the first node 118 and a second curve 608 represents a voltage at the second node 120. As can be seen, the first curve 606, representing voltage at the first node 118 and across the battery 104, shows a voltage drop of about four volts. In contrast, the second curve 608, representing voltage across the EDLC 114 and present to the auxiliary load 112, shows a much smaller voltage drop of about one volt, which is due to the voltage drop across the internal resistance of the EDLC 114.

Sixth Exemplary Embodiment

Figure 7:
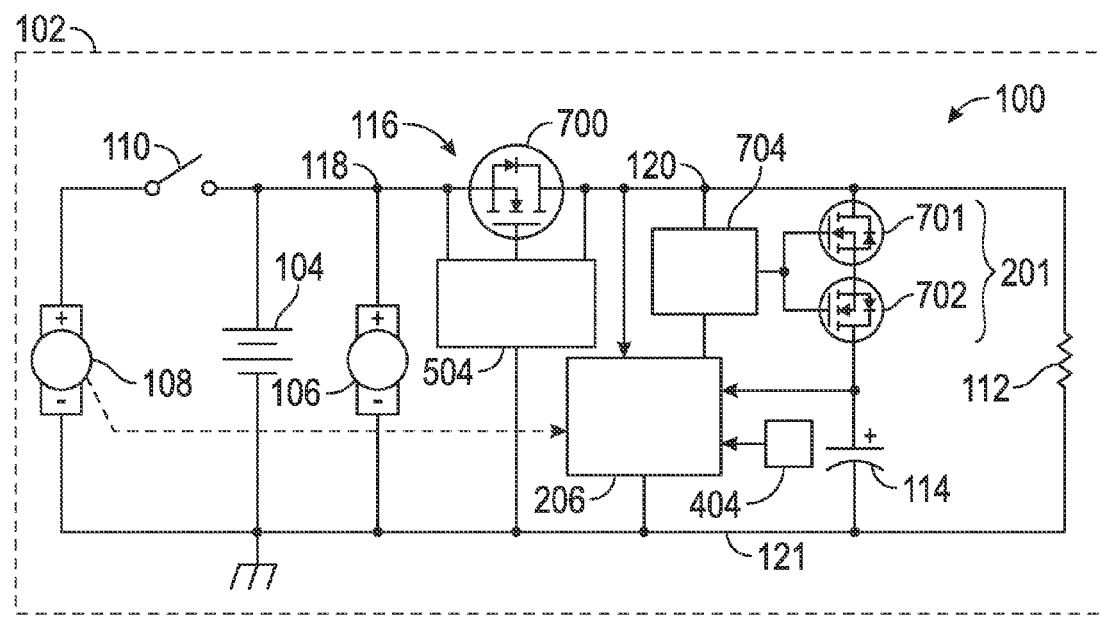
FIG. 7 is an electrical schematic of the electrical system in accordance with a sixth exemplary embodiment.

A sixth exemplary embodiment of the system 100 is shown in FIG. 7. In the sixth exemplary embodiment, the separation switch 116 is implemented as a first MOSFET 700. The charge regulation switch 201 is implemented with a second MOSFET 701 and a third MOSFET 702. The first MOSFET driver 504 is electrically connected to the gate of the first MOSFET 700 to control "on" and "off" operation of the first MOSFET 700, in the same manner as described in the fifth exemplary embodiment. The system 100 further includes a second MOSFET driver 704 electrically connected to gates (not numbered) of the second MOSFET 701 and the third MOSFET 702 to control "on" and "off" operation of the second and third MOSFETs 701, 702.

In the sixth exemplary embodiment, the second MOSFET 701 is electrically connected in anti-series with the third MOSFET 702. Specifically, a source (not numbered) of the second MOSFET 701 is electrically connected to a source (not numbered) of the third MOSFET 702. A drain (not numbered) of the second MOSFET 701 is electrically connected to the first node 120 and a drain (not numbered) of the third MOSFET 702 is electrically connected to the EDLC 114. By electrically connecting the second and third MOSFETS 701, 702 in anti-series, a leaking charge from the EDLC 114 is reduced when the third MOSFET 702 is turned off, i.e., "open". As such, the voltage of the EDLC 114 is more successfully maintained.

The controller 206 of the sixth exemplary embodiment is in communication with the starter mechanism 108 for receiving one or more signals indicating operation of the starter mechanism 108.

In the sixth exemplary embodiment, the EDLC 114 is charged to a predetermined voltage that is higher than the open circuit voltage of the battery 104. This is accomplished by turning the second and third MOSFETs 701, 702 on, i.e., "closed", during operation of the generator 106. Once this predetermined voltage is reached, the second and third MOSFETs 701, 702 are turned off, i.e., "opened".

During engine stop operation of the vehicle 102 of the sixth exemplary embodiment, when the engine and the generator 106 are not operational, the battery 104 supplies power to the auxiliary load 112. Accordingly, the voltage across the battery 104 will fall below that of the EDLC 114, as the second and third MOSFETs 701, 702 are turned off. Once the voltage of the battery 104 falls below a predetermined level or if the driver intends to launch the vehicle, the engine is commanded to automatically start (an "auto-start") and the generator 106 will be engaged to recharge the battery 104.

Once this auto-start is commanded, the second and third MOSFETs 701, 702 are both turned on by the controller 206, thus electrically connecting the EDLC 114 to the auxiliary load 112. The starter mechanism 108 for starting the engine will then draw the voltage of the battery 104 down, resulting in the first MOSFET 700 becoming reverse biased and turned off. Accordingly, the EDLC 114 then exclusively powers the auxiliary load 112.

Figure 8:
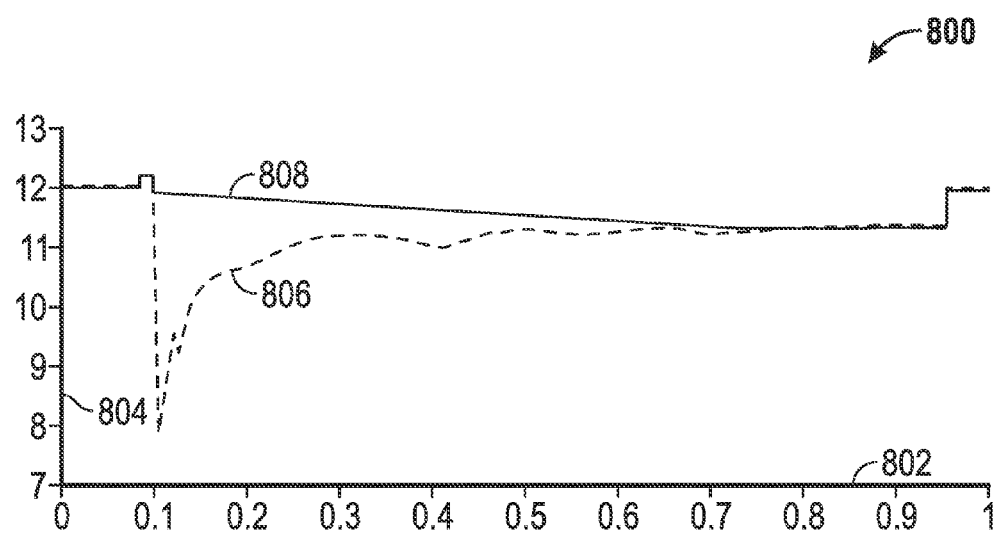
FIG. 8 is a graph showing voltage response of the electrical system in accordance with the sixth exemplary embodiment.

Since the voltage across the EDLC 114 was higher than the voltage across the battery 104 prior to the auto-start, the I*R drop due to the internal resistance of the EDLC 114 is more effectively compensated. As such, the auxiliary load 114 experiences a smaller transient voltage drop and a higher average voltage than in other exemplary embodiments that do not utilize two MOSFETs 701, 702 as the charge regulation switch 201. This effect is shown in FIG. 8, which shows a graph 600 illustrating a simulation of voltage response during operation of the starter mechanism 108. Specifically, the x-axis 802 represents time in seconds and the y-axis 804 represents voltage in volts. A first curve 806 represents a voltage at the first node 118 and a second curve 808 represents a voltage at the second node 120.

A simulation of voltage response of the sixth exemplary embodiment during operation of the starter mechanism 108 is shown in a graph 800 in FIG. 8. Specifically, the x-axis 802 represents time in seconds and the y-axis 804 represents voltage in volts. A first curve 806 represents a voltage at the first node 118 and a second curve 808 represents a voltage at the second node 120. As can be seen, the first curve 806, representing voltage at the first node 118 and across the battery 104, shows a voltage drop of about four volts. In contrast, the second curve 808, representing voltage across the EDLC 114 and present to the auxiliary load 112, which is nearly the same as that of the voltage of the first node 118 before the auto-start event occurring at about 0.1 seconds.

Seventh Exemplary Embodiment

As shown above in the second through fifth exemplary embodiments, but not previously discussed, the position of the EDLC 114 relative to the charge regulation switch 201 may be swapped such that either the charge regulation switch 201 or the EDLC 114 may be directly connected to the second node 120. For example, in the sixth exemplary embodiment, shown in FIG. 7, the charge regulation switch 201 is electrically connected to the second node 120 while the EDLC 114 is electrically connected to the ground node 121.

Figure 9:
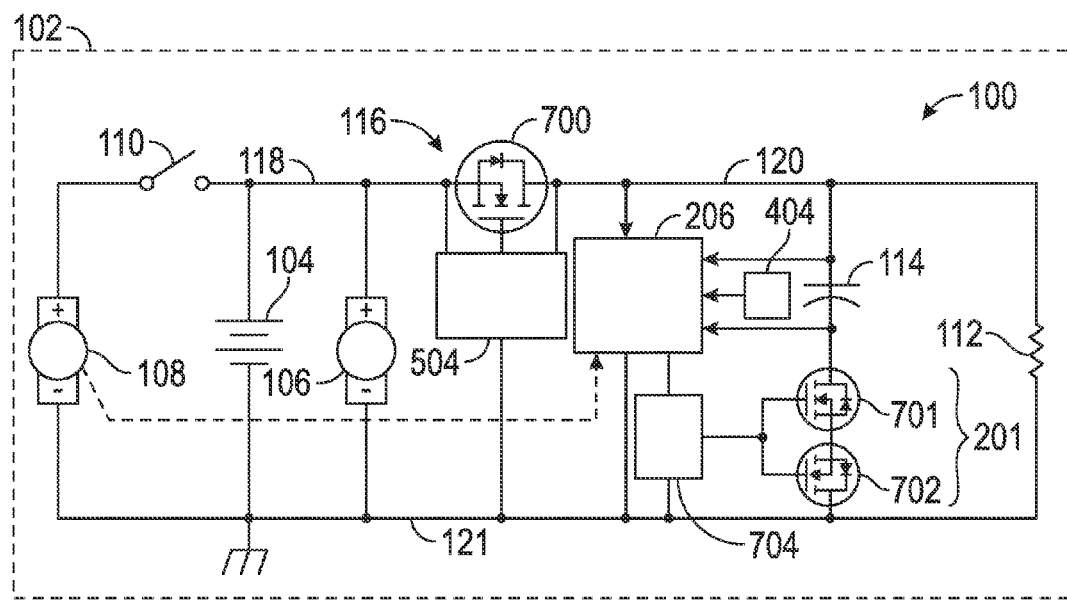
FIG. 9 is an electrical schematic of the electrical system in accordance with a seventh exemplary embodiment.

However, in the seventh exemplary embodiment, as shown in FIG. 9, the EDLC 114 is electrically connected to the first node 120 while the charge regulation switch 201 is electrically connected to the ground node 121. Specifically, in the seventh exemplary embodiment, the charge regulation switch 201 is implemented with the second and third MOSFETs 701, 702 as described in the sixth exemplary embodiment. However, the drain of the second MOSFET 701 is electrically connected to the EDLC 114 and the drain of the third MOSFET 702 is electrically connected to the ground node 121.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system, comprising:
   a battery for providing electrical power to a starter mechanism and an auxiliary load;
   an electric double-layer capacitor ("EDLC") electrically connectable to said battery and the auxiliary load;
   a separation switch electrically connected between said battery and said EDLC that electrically separates said battery from said EDLC; and
   a charge regulation switch electrically connected between said separation switch and said EDLC for regulating the charge stored by said EDLC;
   said charge regulation switch configured to close when (1) the voltage across the battery is less than a predetermined maximum voltage of the EDLC and (2) the absolute value of the difference between the voltage across the EDLC and the voltage across the battery is less than a first predetermined calibration value.

2. A system as set forth in claim 1 wherein said charge regulation switch comprises a mechanically actuated switch.

3. A system as set forth in claim 1 further comprising a temperature sensor in communication with said charge regulation switch for sensing the temperature of said EDLC and opening said charge regulation switch when the temperature of said EDLC exceeds a predetermined value.

4. A system as set forth in claim 1 wherein said charge regulation switch comprises a field-effect transistor ("FET").

5. A system as set forth in claim 1 wherein said charge regulation switch is further defined as two charge regulation switches.

6. A system as set forth in claim 1 wherein said charge regulation switch comprises a first FET and a second FET.

7. A system as set forth in claim 6 wherein said first FET and said second FET are electrically connected in anti-series with one another.

8. A system as set forth in claim 1 wherein said separation switch comprises a Shottky diode.

9. A system as set forth in claim 1 wherein said separation switch comprises a mechanically actuated switch.

10. A system as set forth in claim 1 wherein said separation switch comprises a FET.

11. A system as set forth in claim 1 further comprising a generator electrically connected to said battery for charging said battery and/or said EDLC.

12. A method of controlling an electrical system, the system including a battery for providing electrical power to a starter mechanism and an auxiliary load, an EDLC electrically connectable to the battery and the auxiliary load, a separation switch electrically connected between the battery and the EDLC for electrically separating the battery from the EDLC, and a charge regulation switch electrically connected between the separation switch and the EDLC, said method comprising:
   sensing the voltage across the battery;
   sensing the voltage across the EDLC;
   opening the separation switch to electrically separate the battery from the EDLC in response to the voltage across the battery being less than the voltage across the EDLC; and
   closing the charge regulation switch when (1) the voltage across the battery is less than a predetermined maximum voltage of the EDLC and (2) the absolute value of the difference between the voltage across the EDLC and the voltage across the battery is less than a first predetermined calibration value.

13. A method as set forth in claim 12 further comprising closing the separation switch in response to the voltage across the battery being greater than the voltage across the EDLC.

14. A method as set forth in claim 12 further comprising opening the charge regulation switch when (1) the voltage across the EDLC is greater than or equal to the predetermined maximum voltage of the EDLC, (2) the voltage across the EDLC is less than or equal to a predetermined minimum voltage for the EDLC, or (3) the absolute value of the difference between the voltage across the EDLC and the voltage across the battery is greater than a second predetermined calibration value.

15. A vehicle, comprising:
   at least one electrical load;
   a battery electrically connectable to said at least one electrical load for providing electrical power to said at least one electrical load;
   a generator electrically connected to said battery for supplying electrical power to said battery and/or said at least one electrical load;
   a starter mechanism electrically connectable to said battery for starting a motor;
   a starter motor switch electrically connected between said battery and said starter mechanism for controlling operation of said starter mechanism;
   an electric double-layer capacitor ("EDLC") electrically connectable to said battery;
   a separation switch electrically connected between said battery and said EDLC that electrically separates said battery from said EDLC; and
   a charge regulation switch electrically connected between said separation switch and said EDLC for regulating the charge stored by said EDLC;
   said charge regulation switch configured to close when (1) the voltage across the battery is less than a predetermined maximum voltage of the EDLC and (2) the absolute value of the difference between the voltage across the EDLC and the voltage across the battery is less than a first predetermined calibration value.

* * * * *